US008170191B2

(12) United States Patent
Potekhin et al.

(10) Patent No.: US 8,170,191 B2
(45) Date of Patent: May 1, 2012

(54) METHOD AND SYSTEM FOR HANDLING AUDIO SIGNALS OF CONFERENCE

(75) Inventors: Sergey Potekhin, Modeine (IL); Knaz Eran, Rishon LeZion (IL); Nir Brachel, Zofit (IL); Eyal Leviav, Tel-Aviv (IL)

(73) Assignee: Polycom, Inc., Pleasanton, CA (US)

( * ) Notice: Subject to any disclaimer, the term of this patent is extended or adjusted under 35 U.S.C. 154(b) by 1270 days.

(21) Appl. No.: 10/909,446

(22) Filed: Aug. 2, 2004

(65) Prior Publication Data

US 2006/0026002 A1    Feb. 2, 2006

(51) Int. Cl.
*H04M 3/42* (2006.01)
(52) U.S. Cl. .............................. 379/202.01; 379/204.01
(58) Field of Classification Search ............ 379/202.01–205.01; 370/260–261, 370/401; 709/204, 227
See application file for complete search history.

(56) References Cited

U.S. PATENT DOCUMENTS

| | | | | |
|---|---|---|---|---|
| 5,440,624 A | * | 8/1995 | Schoof, II | 379/202.01 |
| 6,006,253 A | * | 12/1999 | Kumar et al. | 709/204 |
| 6,300,973 B1 | | 10/2001 | Feder et al. | 348/14.09 |
| 6,496,216 B2 | | 12/2002 | Feder et al. | 348/14.09 |
| 6,594,269 B1 | * | 7/2003 | Polcyn | 370/401 |
| 6,760,422 B1 | * | 7/2004 | Kowal et al. | 379/202.01 |
| 6,950,119 B2 | | 9/2005 | Kakii et al. | |
| 7,580,375 B1 | * | 8/2009 | Friedrich et al. | 370/260 |
| 2002/0123895 A1 | | 9/2002 | Potekhin et al. | 704/275 |
| 2002/0159394 A1 | | 10/2002 | Decker et al. | |
| 2002/0188731 A1 | | 12/2002 | Potekhin et al. | 709/227 |
| 2003/0174202 A1 | | 9/2003 | Eshkoli et al. | |
| 2003/0223562 A1 | * | 12/2003 | Cui et al. | 379/202.01 |
| 2004/0042553 A1 | | 3/2004 | Elbaz et al. | 375/240.25 |

OTHER PUBLICATIONS

Office Action dated Sep. 28, 2009 in U.S. Appl. No. 11/148,103.

* cited by examiner

*Primary Examiner* — Ahmad Matar
*Assistant Examiner* — Sonia Gay
(74) *Attorney, Agent, or Firm* — Wong, Cabello, Lutsch, Rutherford, & Brucculeri, LLP (57) ABSTRACT

A new system and method particularly useful in handling the audio of a "large" conference is disclosed. The system and method initially defines certain conferees as panel members, which can provide audio to and receive audio from the conference, and audience members, which only passively receive audio from the conference. In one aspect, an audience member can request to participate in the conference. By making an appropriate request, the audience member can, if system resources are adequate, participate fully as a panel member and may supply audio to the conference for at least some portion of time. Alternatively, the audience member can supply information other than audio data to the conference, such as voting data or other data allowing the audience member to participate in the conference as more than a merely passive listening participant.

47 Claims, 4 Drawing Sheets

METHOD AND SYSTEM FOR HANDLING AUDIO SIGNALS OF CONFERENCE

FIELD OF THE INVENTION

The present invention relates to the field of audio/video conferences and more particularly to a method and a system for handling audio signals of a conference.

BACKGROUND

Different methods for handling audio of a conference are known in the art. Typically, the same architecture for handling audio is used regardless of whether the conference is "small" or "large." A "large" conference may be considered as having ten or more conferees, for example. In a conference, a Multipoint Control Unit (MCU) controls the audio and/or audio/video. The MCU is typically located in a node of a network or in a terminal, such as an "endpoint" associated with a user who participates in the audio or audio/video conference. The MCU receives several channels from access ports, processes audio and visual signals according to certain criteria, and distributes the processed signals to a set of connected channels. An example of an MCU includes the MGC-100, which is available from Polycom Inc. It should be noted that an MCU may also be referred to as an Audio Bridge when only used for an audio conference, and therefore in the present disclosure, the term "MCU" may also be used to represent an Audio Bridge.

When conducting a "large" conference, each conferee is typically connected to a common audio port in the MCU. The audio ports include a decoder, audio signal analyzer (to analyze for example signal energy, DTMF (Dual Tone Multi-Frequency) signaling, voice activation commands, etc.), a mixer, an encoder, and a controller. More information about common audio ports in a multipoint control unit (MCU) can be found in U.S. Patent Application Publication Nos. U.S. 20020123895 and U.S. 20020188731, which are both incorporated herein by reference in their entireties.

Conducting a "large" conference requires a large number of audio resources, increases the cost of the MCU, and reduces the number of conferences that can be simultaneously controlled by an MCU. Furthermore, a large common interface (a bus, for example) is typically required to carry the open audio between the different audio ports associated with the same conference. In some cases, a larger common interface increases the delay between talking and listening, because the time interval between two sequential transactions over the bus increases with the size of the bus. In addition, a large number of inputs and outputs modules associated with the same conference place a heavy load on the controller of the conference.

Another prior art method for handling the audio of a "large" conference delivers an audio port to each one of the conferees that belongs to a particular group of conferees (a panel, for example). The rest of the conferees (e.g., the audience) receive a multicast or broadcast of the mixed audio of the panel. This method reduces the load on the controller and required resources. However, a conferee in the audience is unable to contribute to the conference. For example, the audience member is unable to take any active part in the conference or to change the conferee's current state as an audience member in the conference. In addition, the audience member is unable to speak, to vote on a topic being discussed during the conference, etc.

Current techniques for processing the audio of a "large" conference are thus not ideal, and a need exists in the art for a system and method for better controlling the audio of a "large" conference.

SUMMARY OF THE DISCLOSURE

New systems and methods for handling the audio of a "large" conference are disclosed. Statistical observations indicate that most conferences have less than ten conferees, and in the case of "large" conferences having more than 10 conferees (e.g. 20, 50 or even up to thousands of conferees), only a group of less than ten conferees are usually active (e.g., speaking or eligible to speak) at any one time. This active group can be referred to as the panel group. The rest of the conferees can be referred to as the audience group. However, from time to time, a conferee from the audience group will desire to contribute to the conference. Accordingly, the methods and systems of the present disclosure enables conferees of the audience group to contribute while saving conference resources and while reducing the amount of audio processing.

In an exemplary embodiment, an audio unit of an MCU includes, among other modules, a plurality of panel modules (PMs), a plurality of audience input modules (AIMs), and a Compressed Audio Common Interface (CACI). The audio unit can be controlled by a host and/or a management and control system (MCS) via a control bus. Each panel module can be associated with a panel group of a "large" conference or can handle the audio of a small conference.

An exemplary panel module includes two or more audio ports, a panel controller, and a decoded audio common interface (DACI). Each audio port can be associated with a conferee belonging to a panel group or to a small conference. Each audio port receives compressed audio from its associated conferee via a network interface unit and the CACI, and likewise delivers a compressed mixed audio to the associated conferee. The compressed mixed audio from one or more audio ports can also be broadcast and/or multicast to one or more groups of audience conferees in the "large" conference.

Another exemplary embodiment of an audio unit includes a Broadcast/Multicast Port (BMP), which is an additional type of port. Each Broadcast/Multicast Port can be associated with a group of one or more audience conferees that are using the same audio compression standard. Each Broadcast/Multicast Port obtains the appropriate one or more uncompressed audio streams from the DACI, mixes the one or more uncompressed audio streams into one stream, and encodes the mixed stream according to the appropriate compression standard. The BMP then delivers the compressed mixed audio to the associated one or more conferees via the CACI and one or more network interface units, where it is broadcast and/or multicast to the audience conferees associated with the BMP.

Conferees of the audience group contribute to the conference by sending electronic signals or data in the form of requests, commands, or information to the audience input modules. In one embodiment, each one of the audience input modules is associated with a conferee of the audience group, and the audience input module includes a decoder/parser and a Request Signal Analyzer (RSA). In an exemplary embodiment, a request or signal from an audience conferee is transferred using a DTMF signal embedded in an audio signal (i.e., the DTMF signal is transferred in-band). The decoder/parser of the audience input module, which can be a generic audio decoder, decodes the compressed audio signal coming from its associated audience conferee. An exemplary Request Signal Analyzer can be a DTMF detector that receives the decoded audio of the audience conferee and determines whether the decoded signal is a DTMF symbol. If the signal is a DTMF, the DTMF symbol is transferred to the MCS. The DTMF symbol can represent a wish to contribute by the associated audience conferee, such as by representing a wish to speak, to vote, to remove a previous request, etc.

In another exemplary embodiment, the electronic signals or data for the requests or commands from an audience conferee are transferred to the MCU using speech recognition methods. In this embodiment, the decoder of the audience input module can be a generic audio decoder, and the Request Signal Analyzer can be a speech recognition module that analyzes and appropriately processes the request.

In another exemplary embodiment, the electronic signals or data for the requests or commands from an audience conferee is delivered via an out-of-band stream. In this embodiment, an exemplary decoder/parser is a parser for parsing the data stream and looking for an appropriate string of bits. An exemplary audience input module can be a task in the MCS that receives the out-of-band request and analyzes the request.

Upon receiving an electronic signal for a request from an audience conferee to contribute, an audio port in one or more panel modules can be temporarily allocated to the requesting conferee, and thus during the allocated period, the requesting conferee can act as a panel conferee. At the end of the period the requester's audio can be switched back to an audience input module.

The foregoing summary is not intended to summarize each potential embodiment or every aspect of the present disclosure, and other features and advantages of the present disclosure will become apparent upon reading the following detailed description of the embodiments with the accompanying drawings and appended claims. Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Embodiments of the invention will be more readily understood from reading the following description and by reference to the accompanying drawings, in which.

DETAILED DESCRIPTION

Figure 1:
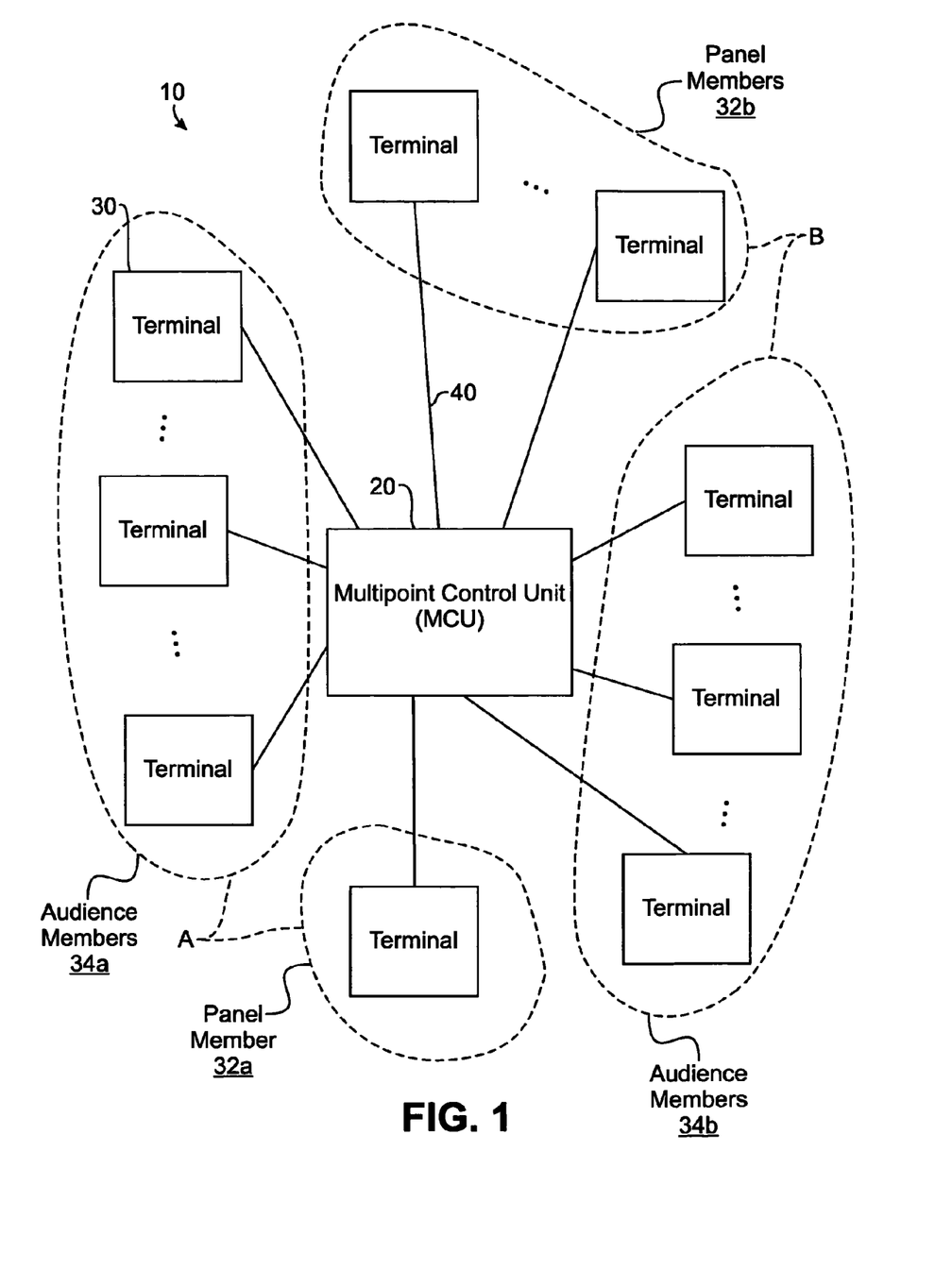
FIG. 1 is a block diagram illustrating an exemplary embodiment of an audio conference system.

An embodiment of a conference system 10 according to certain teachings of the present disclosure is schematically illustrated in FIG. 1. The conference system 10 can be an audio conference or a multimedia (e.g., audio/video/data) conference. The conference system 10 has a plurality of conference endpoints or terminals 30 where conferees are located. The conference terminals 30 are connected over one or more communication networks 40 to a multipoint control unit (MCU) 20. Each conference terminal 30 is capable of providing real-time, two-way audio, audio/video, and/or audio/video/data communication with other conference terminals 30 or with the control unit 20. Exemplary conference terminals 30 can be regular telephones, cellular telephones, IP Phones, video communication endpoints, etc. The communication networks 40 can be packet-based networks, circuit switched networks, and/or other networks or communication protocols, such as ISDN, ATM, PSTN, cellular and/or IP. The disclosed systems and methods are not limited to a particular type of communication protocol or network.

Two large conferences, A and B, are illustrated in FIG. 1. The conferees for each of the conferences, A and B, are defined according to two types, and the type of the conferee can preferably be changed from one type to the other during the conference. A first type of conferee, a "panel" member or conferee 32a&b, can listen to the audio and can speak during the conference. Thus, the conference terminals 30 for the panel members 32a&b are capable of receiving audio signals of the conference and are capable of sending audio signals to be transmitted throughout the conference. A second type of conferee, an "audience" member or conferee 34a&b, can listen to audio signals during the conference. In addition, the audience members 34a&b can send one or more electronic signals or data representing requests, commands, or responses to the control unit 20 from their conference terminals 30. The requests, commands, or responses can include a request to speak during the conference, a vote, a response or message to other members of the conference, or a command to the control unit 20 for performing a function, such as deleting a previous request.

Defining the type of conferee can be done automatically and can be done when reserving the conference, when starting the conference, or when connecting a conferee. When establishing a connection with the terminal 30 of an audience member 34, for example, the control unit 20 temporarily allocates resources (e.g., a temporary audio port) to communicate with the conference terminal 30 during the setup of the connection. The temporary resources are typically released after setting the connection. During the setup via the temporary audio port, the audience conferee is informed by the control unit 20 how to generate specific requests. For example, the audience conferee can be informed of which buttons to press on a keypad at the conference terminal 30, what words to say to initiate a request, how to set an out-of-band control channel, or how to connect an additional means to communicate requests.

The requests or signals from the audience terminals can be sent using in-band signals, out-of-band signals, DTMF signals, or voice, for example. The control unit 20 analyzes and responds to the requests or signals as will be described in detail later. If the request is to speak during the conference, for example, the control unit 20 can allocate an audio port for the requesting terminal 30 and can enable the requester to speak during the conference.

Figure 2:
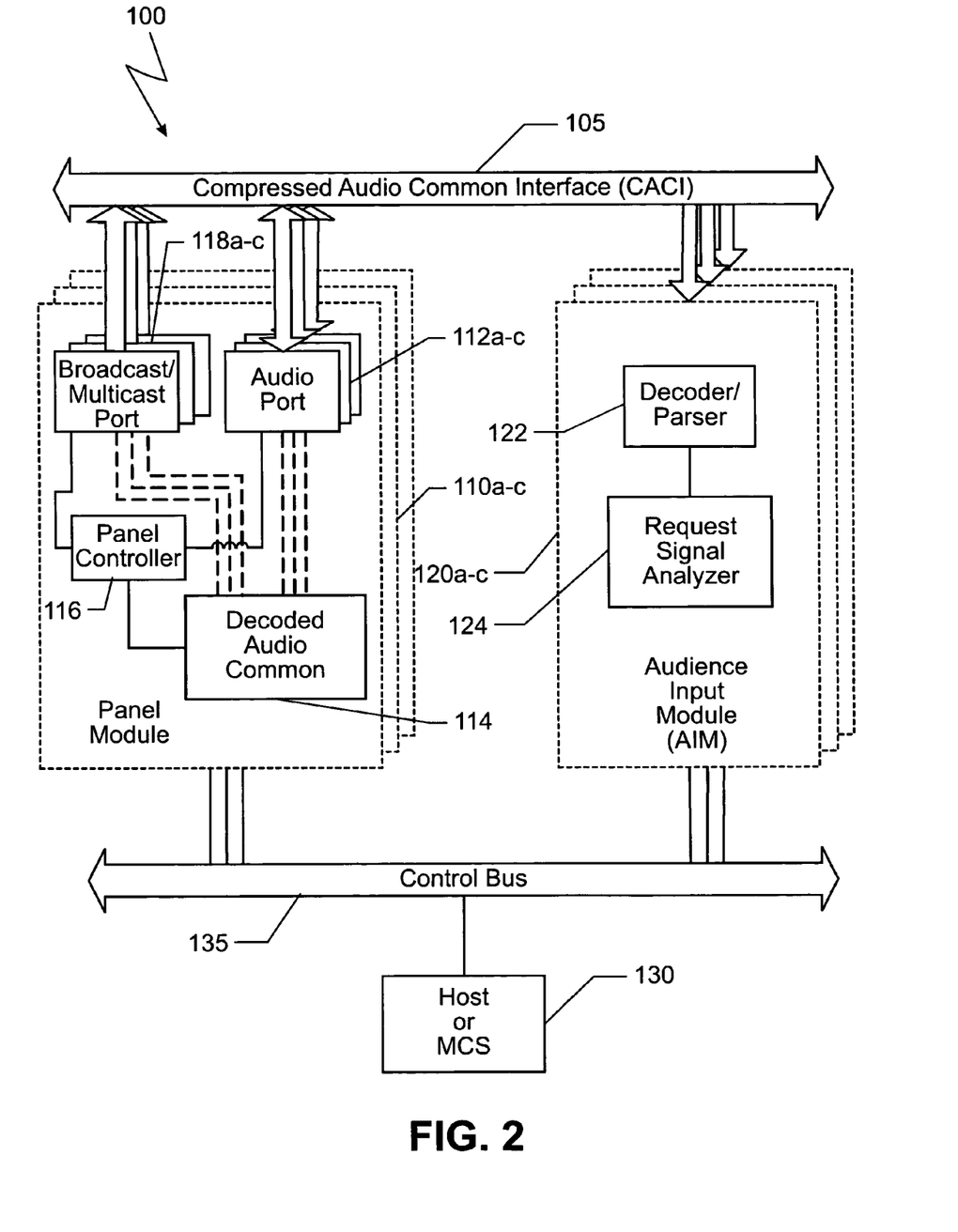
FIG. 2 is a block diagram illustrating an exemplary embodiment of an audio unit within an MCU.

FIG. 2 is a block diagram showing some of the logic elements of an exemplary audio unit 100 within a multipoint control unit (MCU). The audio unit 100, amongst other functions, processes and prepares audio streams for transmission to two or more conference terminals or endpoints (not shown). As noted above, each conference terminal is associated with a conferee participating in the conference. In the present exemplary embodiment, the audio unit 100 includes a compressed audio common interface (CACI) 105, a plurality of panel modules (PMs) 110a-c, a plurality of audience input modules (AIMs) 120a-c, a control bus 135, and a central control unit 130. The central control unit 130 can be a host or a management conference system (MCS).

The panel modules 110*a-c* are designated for panel members of the conference according to the techniques disclosed herein. As noted above, the panel members of the conference are those members able to speak and listen during the conference. Each panel module 110*a-c* preferably includes one or more audio ports 112*a-c*, a Decoded Audio Common Interface (DACI) 114, one or more broadcast/multicast ports (BMP) 118*a-c*, and a panel controller 116. The DACI 114 enables data to be shared among a plurality of destinations, and can comprise a shared memory, or a bus such as but not limited to a TDM bus, an internal bus of a DSP, a shared memory in a DSP, etc.

The audience input modules 120*a-c* are designated for audience members of the conference according to the techniques disclosed herein. As noted above, the audience members of the conference are those members able to listen during the conference. Each audience input module 120*a-c* includes a decoder/parser 122 and a Request Signal Analyzer (RSA) 124.

By way of example only, three units of panel modules 110*a-c*, audience input modules 120*a-c*, audio ports 112*a-c*, and BMPs 118*a-c* are shown in FIG. 2. It is understood that the disclosed system and method can be used with any number of units. In addition, it is understood that other audio units within an MCU can have different configurations aside form that schematically shown and described herein.

As noted above, a plurality of conference endpoints or terminals (not shown) are connected over one or more communication networks (not shown) to the MCU. The conference terminals send their compressed audio streams to the plurality of panel modules 110*a-c* and audience input modules 120*a-c* via Network Interface Modules (not shown) and the CACI 105. In addition, the conference terminals receive compressed audio streams from the appropriate audio ports 112*a-c* or BMPs 118*a-c* via the CACI 105 and the Network Interface Modules (not shown).

The CACI 105 transfers the compressed audio streams between the audio ports 112*a-c*, the audience input modules 120*a-c*, BMPs 118*a-c*, and the network interface modules (not shown). The CACI 105 can be a TDM bus, a packet-based bus (such as an ATM bus or IP bus), a serial bus, a parallel bus, a connection switching mechanism, a shared memory, a direct connection, a wireless connection, or any variety of these. The operation of the audio unit 100 is controlled by the central control unit 130 via the control bus 135. The central control unit 130 can be a host computer or an internal module of the MCU. In the present disclosure, the central control unit 130 is referred to as a management conference system (MCS).

Each panel module 110*a-c* and/or audience input module 120*a-c* can be a logic unit, a hardware module, a firmware module, a software module, a DSP, or any combination of these. Moreover, each panel module 110*a-c* and/or audience input module 120*a-c* can be permanent or temporary, which is generated by the MCS 130 according to current needs. Using temporary logic modules and allocating the appropriate modules according to the current needs conserves the resources of the MCU.

The number of panel modules 110*a-c* and/or audience input modules 120*a-c* associated with an audio conference can be a fixed number or can be varied according to the needs of the audio conference. Usually, a "small" audio conference may need only one panel module (e.g., 110*a*) having a plurality of audio ports 112*a-c* with one audio port 112*a-c* for each one of the conference terminals participating in the audio conference. A panel module 110*a-c* for a small conference may not require a BMP 118*a-c*. On the other hand, a "large" audio conference may need one or more panel modules 110*a-c* having a plurality of audio ports 112*a-c* and BMPs 118*a-c*. In such a case, an audio port 112*a-c* can be associated with each of the conference terminals of a panel group, with one BMP 118*a-c* associated with each group of audience conferees that use the same compression protocol or standard. In other exemplary embodiments, the output of one or more of audio ports 112*a-c* can be broadcast or multicast to a group of audience conferees that use the same compression standard. In addition to the panel module 110, a number of audience input modules 120*a-c* may be needed. One audience input module 120 can be associated with each one of the conference terminals of an audience group.

Each audio port 112*a-c* receives compressed audio from its associated conferee via a network interface unit (not shown) and CACI 105. In addition, each audio port 112*a-c* delivers compressed mixed audio to its associated conferee via CACI 105 and the network interface unit. The compressed mixed audio from one or more audio ports 112*a-c* can also be broadcast and/or multicast to a group of audience members using the same compression standard.

In one exemplary embodiment, the audio ports 112*a-c* includes a decoder, an analyzer and enhancer unit, a selector, a mixer, and an encoder. The panel controller 116 receives the results of the analyzer and enhancer unit of each one of the audio ports and controls the operation of the selector and the mixer in each one of the audio ports 112*a-c*.

In another exemplary embodiment, each one of the audio ports 112*a-c* can have a codec, which includes a generic decoder and a generic encoder for decoding/encoding the voice data according to the compression standard that is used by the conference terminal associated with the audio port. The BMP 118*a-c* of such an embodiment can also have an encoder. All other generic logic units that are required for mixing audio (e.g., analyzer and enhancer units, control units, switching and mixing units) can be located in the panel controller 116. The panel controller 116 in such an embodiment can be connected to the DACI 114. The panel controller 116 can then receive the plurality of uncompressed audio streams from the DACI 114, analyze the streams, select and mix the appropriate streams, and deliver the mixed streams back to the DACI 114. The encoder of each one of the audio ports 112*a-c* and/or the BMPs 118*a-c* gets the appropriate mixed uncompressed stream from DACI 114, encodes it, and sends it to the associated one or more conference terminals via the CACI 105.

Various standards may be involved in compression of voice data. For example, the ITU G.729 voice compression standard, which is applicable to video conferencing systems, and the ITU G.723.1 high compression ratio standard may be used. Numerous other standards exist for different systems, including but not limited to, G.711, G.728, etc.

An exemplary BMP 118*a-c* can have, among other elements, a selector, a mixer, and an encoder (not shown). The selector, according to commands from the panel controller 116, gets the appropriate uncompressed audio streams from DACI 114, and delivers them to the mixer. The mixed uncompressed audio from the mixer is transferred to the encoder to be compressed according to the compression standard that is used by the associated group of audience conferees. The compressed mixed audio is broadcast or multicast via the CACI 105 and the appropriate network interfaces (not shown) to the networks (not shown) and from the networks to the associated group of conference terminals (not shown).

In another exemplary embodiment in which the panel controller 116 includes a mixer, the BMP 118 can have an encoder that receives the appropriate uncompressed mixed stream from the DACI 114 based on commands from the panel controller 116. The BMP 118 can then encode the mixed stream according to the appropriate compression standard and transfer the compressed mixed audio to the CACI 105 to be broadcast or multicast to the appropriate conference terminals (not shown).

To improve the operation of a panel module 110*a-c* and reduce any processing delay, the panel module 110*a-c* can be implemented within a hardware chip (a DSP, for example), in which case the DACI 114 can be an internal part of the DSP. For example, DACI 114 can be, but is not limited to, an internal bus of the DSP or the internal memory of the DSP. However, there are embodiments in which one DSP can serve more than one panel module 110*a-c*, or in which one panel module 110*a-c* can be distributed over more than one DSP.

The panel controller 116 receives commands from MCS 130 and sends indications to MCS 130 over control bus 135. Exemplary commands can include adding a certain conferee to the panel, removing one or more conference terminals (i.e., removing compressed audio streams over CACI 105) from the panel group, allocating resources, etc. Exemplary indications that can be sent from the panel controller 116 to the MCS 130 can include indication of the one or more speakers currently in the conference, the duration that each one of the panel members has been active in the conference, indications concerning a certain conferee that has not spoken for a period longer than a certain number of minutes, etc.

More information on the operation of the audio ports 112, the panel controller 116, and the generic logic units (decoders, encoders, analyzer and enhancer units, mixers, etc.) is disclosed in U.S. Patent Application Publication Nos. U.S. 20020123895 and U.S. 20020188731, which are both incorporated herein by reference in their entireties.

As noted, each one of the audience input modules 120*a-c* can be associated with a conferee that belongs to an audience group. By way of review, each audience input modules 120*a-c* includes a decoder/parser 122 and a request signal analyzer 124. In an exemplary embodiment, an audience input module 120*a-c* receives an appropriate compressed audio stream from an associated conference terminal via CACI 105. The compressed audio stream is decoded by decoder/parser 122 according to the compression standard used by the conference terminal. The decoded stream is transferred to the analyzer 124, which determines whether the decoded signal is a request from the audience conferee. If so, the request is transferred to the MCS 130 via the control bus 135.

In one embodiment, the request can be initiated by pressing a button on a keypad of the conference terminal and transmitting a DTMF signal in-band as an audio signal. In this embodiment, the decoder/parser 122 can be a generic audio decoder, and the analyzer 124 can be a DTMF decoder. The decoded DTMF signals are analyzed, and the one or more symbols that have been pressed by the requesting audience member are transferred to the MCS 130 via the control bus 135. The DTMF symbols can represent a request or command from the associated audience conferee. For example, the DTMF symbols can represent a wish to speak, to vote, to cancel a previous request, etc.

Other exemplary embodiments can use speech recognition methods to transfer requests from an audience conferee to the MCU. In such embodiments, the decoder/parser 122 can be a generic audio decoder, and the analyzer 124 can be a speech recognition module that analyzes the vocal request from the conferee.

In still other alternate embodiments, the request from an audience conferee can be sent over one or more out-of-band channels, such as a control channel instead of through the audio channel. For example, the communication protocol for one embodiment can be Internet Protocol (IP), such as but not limited to H.323 or SIP. In such an embodiment, a control channel between an audience conferee and the MCU can be established according to H.245 standard. As well as carrying the conferee's request, the control channel can be used to carry a report from the MCS 130 concerning events that the requester can select. For example, the report can inform that the requester press a key associated with the number '3' to vote on a particular issue for example, and as will be explained in further detail later.

In one embodiment, an audience input module 120 can be a software module or task that is part of the MCS 130 software, and which is invoked upon receiving a request from an audience conferee. The audience input module task can handle the event using a method, such as disclosed below in conjunction with FIG. 4.

Other exemplary embodiments can use other techniques for sending a request to the MCU over another connection or even over another network aside from links used to carry the audio communication. For example, a requester having a communications device (e.g., a computer, cellular phone, Personal Data Assistant, etc.) can send a request via the Internet as an instant message, an SMS message, etc. In another modification, the MCU and the audience conferees can share a chat room for communicating requests, for example.

Figure 3:
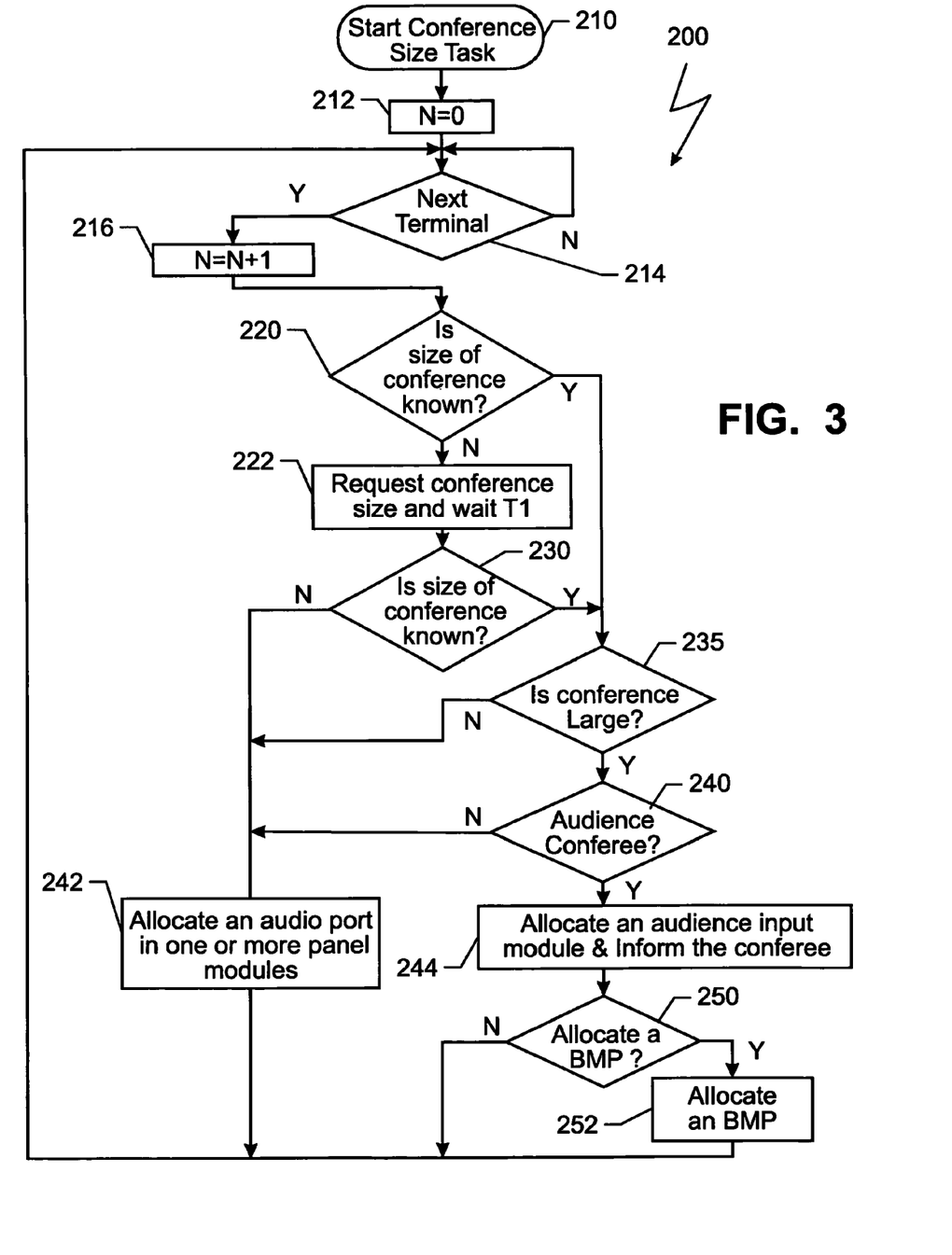
FIG. 3 is a flowchart showing an exemplary method for defining the conference size and for allocating the appropriate audio resources.

FIG. 3 is a flow chart showing steps of an exemplary method 200 for allocating audio resources according to the type of the conference (large or small) and the type of conferee (a panel member or an audience member). Method 200 can be performed by the Management Conference System (MCS) 130 (FIG. 2), and is initiated at step 210 when a new conference is started. After initiation, a counter 'N' is set to zero in step 212, a panel module (110, FIG. 1) is allocated to the conference, and the method 200 waits for a first conference terminal to enter the queue in step 214.

If there is a conference terminal waiting in the queue for resource allocation, then the counter 'N' is increased by one in step 216. In step 220, a decision is then made whether the size of the conference associated with the current session is known. If the size of the conference is unknown at step 220, then a question may be presented to the current conferee. For example, the MCU can use IVR (Interactive Voice Recognition) to ask the current conferee about the type of conference, with a response provided step 222 within a waiting period T1 (e.g., from a few seconds to a few minutes). At the end of the waiting period, a decision is made whether the size of the conference is known at step 230. If not known, the method 200 proceeds to step 242, where an audio port is allocated in one or more panel modules (110*a-c*, FIG. 2).

If the size of the conference is known at step 230, a decision is made whether the conference is a "large" conference or not at step 235. A "large" conference can be predefined, for example, as a conference having ten or more conferees. In addition, different methods can be used to define the size of the conference and whether it can be consideration "large". For example, the size of the conference can be defined when reserving the conference. Other embodiments can use different dialing numbers or Personal Identification Numbers (PINs) to distinguish a "small" conference from a "large" conference.

Other embodiments can check the value of 'N' and compare it to a predefined value 'N1' (e.g., 8, 10, 15 conferees). If 'N' is greater than 'N1', then the type of the conference is set to "large." If not greater, the conference type is set to "small." Checking the value of conference terminals can be done automatically and can be adapted to current needs. For example, the type of the conference (e.g., "small" or "large") can be automatically changed during the conference, depending on the current number of conferees.

If the conference is "small," then the panel controller (116, FIG. 2) is instructed at step 242 to allocate an audio port (112*a-c*) to the current conferee. Concurrently, information is also transferred to the panel controller, which includes, but is not limited to, the compression standard used by the conferee, information regarding the CACI (105, FIG. 2) relevant to this conferee, etc. Then, the method 200 returns to the queue at step 214 for the next conferee in the queue.

If the conference type is "large" at step 235, then a decision is made at step 240 whether the current conferee is a panel member or an audience member. This decision can be made by various methods. For example, a different PIN can be "dialed in" by the conferee depending on his status as a panel or audience conferee. Alternatively, IVR can be used to allow the conferee to speak his status. An automatic method can also be used which can define, for example, that any conferee joining the conference after the first N1 conferees is an audience conferee, while the first N1 conferees are panel conferees.

If the current conferee is not an audience conferee at step 240, then an audio port (112*a-c*, FIG. 2) is allocated at step 242, and the method 200 proceeds as it is disclosed above for establishing audio resources to a panel conferee. If the current conferee is an audience conferee at step 240, an audience input module (120*a-c*, FIG. 2) is allocated at step 244 to the current conferee. The audience input module is set according to the parameters of the current conferee, with such parameters depending on the method that is used for transferring requests or signals. For example, if a DTMF signal embedded in the audio signal coming from the conference terminal is to be used, then the parameters can constitute the compression standard used by the conferee's terminal as well as information related to the location of the compressed audio coming from the conference terminal over the CACI (105, FIG. 2).

After allocating the appropriate audience input module, the MCU informs the conferee that he has been connected as an audience conferee. The MCU can also inform the conferee how to create and send requests, signals, or commands to the MCU as noted earlier. For example, the audience conferee can be informed by the MCU that the conferee can contribute to the conference by pressing buttons '5' for speaking, '3' for voting 'YES', '7' for voting 'NO', '1' for removing the previous request or signal, '#' for deleting all previous requests signals, etc.

After allocating the audience input module at step 244, a decision is made at step 250 whether to allocate a broadcast/multicast port (BMP 118*a-c*, FIG. 2). The decision can be based on the compression standard used by the current conferee. If there is already a BMP that handles the conferee's compression standard, then there is no need to allocate additional BMPs, and the method 200 returns to step 214 for the next conferee in the queue.

If the current conferee is the first audience conferee that uses the compression standard, then a BMP is allocated at step 252 to handle that compression standard. The BMP can obtain information on the compression parameters and information on the relevant location over the CACI (105, FIG. 2) associated with the allocated BMP. Then, the method 200 returns to step 214 for the next conferee in the queue.

Figure 4:
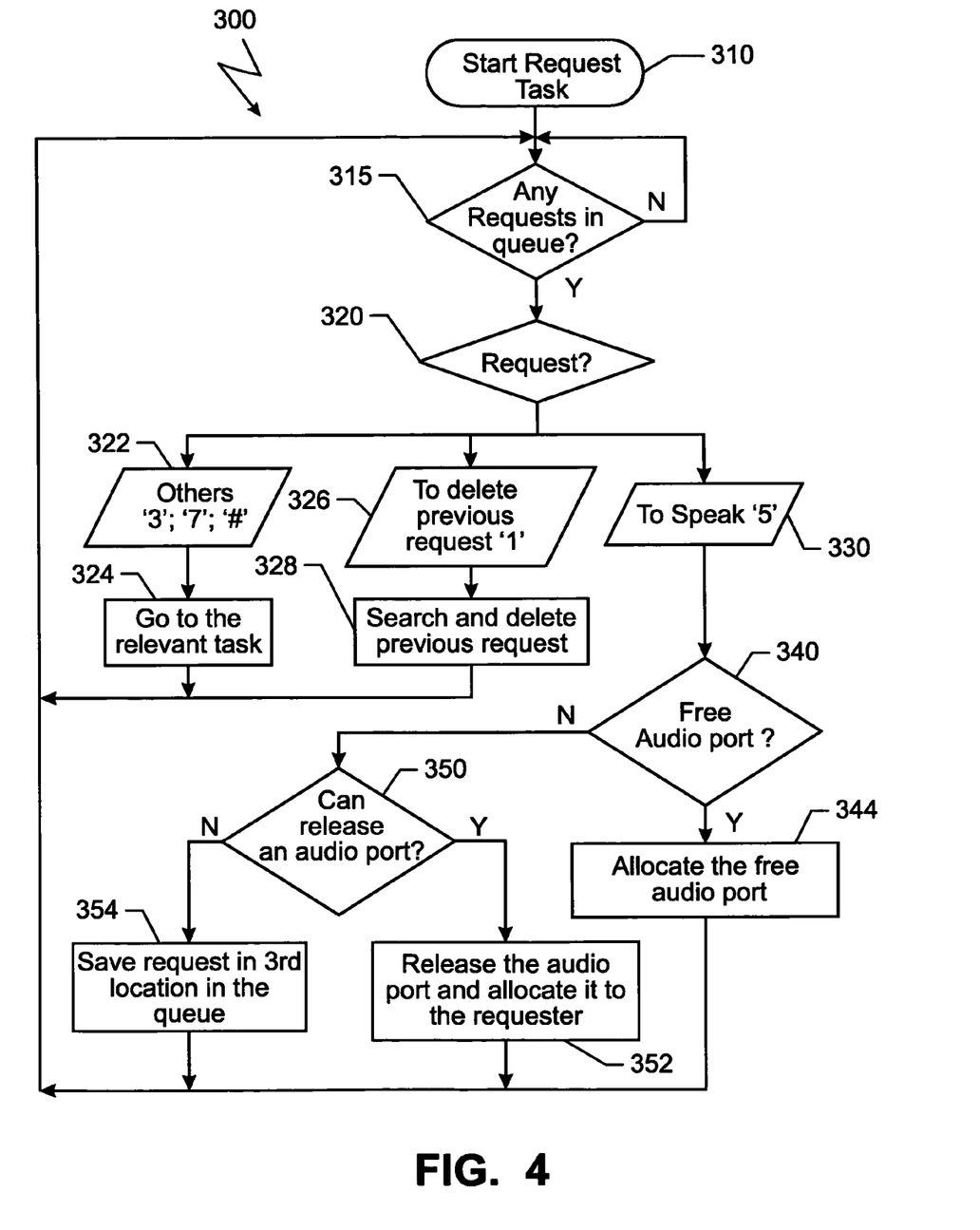
FIG. 4 is a flowchart showing an exemplary method for handling electronic signals or data representing a request or command from an audience conferee during the conference.

FIG. 4 is a flow chart showing steps of an exemplary method 300 for responding to a request, signal, or command coming from an audience conferee. The disclosed method 300 is initiated at step 310 during the start of a new conference. After initiating, the method 300 waits at step 315 for the first conferee request to enter the queue. If there is a request waiting in the queue, then the type of the request is analyzed at step 320. In the present embodiment, the method 300 uses DTMF signals as an exemplary way to carry requests. Other embodiments can use other type of signals to carry the requests as noted earlier.

If the request is to speak at step 330 (e.g., if the received DTMF symbol was '5'), then a decision is made at step 340 whether there is a free audio port (112*a-c*, FIG. 2) that can be allocated to the requester. If there is a free audio port, the free port is allocated at step 344 to the requester, the request is deleted from the queue, and the audience input module (120*a-c*, FIG. 2) assigned to this conferee can be released. Then, the conferee currently connected to that audio port is informed that his status has been changed from an audience conferee to a new panel member and that he can start speaking to the conference. Then, the method 300 returns to step 315 for the next request in the queue.

If there is no free audio port at step 340, then a decision is made at step 350 whether an audio port can be released. Different criteria can be used to make the decision whether to release a certain audio port at step 350. In one example, an audio port that has not been active for a period longer than a certain duration (e.g., 3, 5, 10, etc. minutes) can be released to the requester. Other criteria can reserve a certain number of audio ports for audience conferees (so-called audience audio ports). The audience audio ports can be released when a previous audience conferee terminates his contribution to the conference. Other criteria can release an audience audio port after a certain period of time. For example, audience audio ports can be allocated for only a few minutes and then released automatically. Other exemplary embodiments can use other criteria for releasing an audio port, such as determining whether the conferee has made previous requests and accordingly whether it is fair to grant that conferee access at a particular point in time.

If an audio port can be released at step 350, then the conferee currently connected to that audio port is informed that his status has been changed from a panel member to a new audience conferee at step 352. The new audience conferee is also informed how to create and send requests to the MCU, an audience input module is allocated to the new audience conferee, and the audio port is allocated to the requester.

If an audio port cannot be released at step 350, then the request is removed from the first location in the queue to a lower location at step 354 (e.g., to the third location in the queue) for reconsideration at a later time. Then, the method 300 returns to step 315 for the next request in the queue.

If the request at step 326 is to delete the previous request, signal, or command (e.g., the requester has pressed button '1'), then the previous request is searched in the queue and is deleted at step 328. Then, the method 300 returns to step 315 for the next request in the queue.

If the request, signal, or command is any other type at step 322 (e.g., the requester presses button '3', '7', '#', etc.), then the method 300 invokes an appropriate task for handling the request at step 324. For example, a voting task can be invoked if the requester has pressed buttons '3' or '7'. Then, the method 300 returns to step 315 for the next request in the queue.

In this application, the words "unit" and "module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

In the description and claims of the present disclosure, each of the verbs, "comprise", "include", "have", and conjugates thereof, are used to indicate that the object or objects of the verb are not necessarily a complete listing of members, components, elements or parts of the subject or subjects of the verb.

Those skilled in the art will appreciate that the present invention can be implemented in the form of additional software residing in the MCU for performing the methods disclosed herein, additional hardware added to the MCU, or additional software or hardware distributed among the MCU and the conference terminals.

Furthermore, those skilled in the art will appreciate that the present invention can be used with any variety of compression standards including, but not limited to G.711, G.728, AMR, and MPEG audio compression. More information on these standard may be found at the website of International Telecommunications Union (ITU), www.itu.int, at www.3GPP.org, or at www.mpeg.org.

The described embodiments comprise different features, not all of which are required in all embodiments of the invention. Some embodiments of the present invention utilize only some of the features or possible combinations of the features. Different combinations of features noted in the described embodiments will occur to persons skilled in the art. The scope of the invention is limited only by the following claims.

What is claimed is:

1. A method of conducting a conference between a plurality of terminals with a conferencing control unit, the method comprising:
    designating at the control unit at least one terminal as a panel terminal;
    allocating an audio port for each of the at least one panel terminal;
    designating at the control unit at least one terminal as an audience terminal;
    associating a broadcast-multicast port with at least one audience terminal based on a total number of the plurality of terminals;
    receiving and decoding compressed audio signals from the at least one panel terminal at the control unit via its associated audio port;
    mixing the received decoded audio signals at the control unit to generate a mixed audio signal for sending to the at least one panel terminal via its associated audio port and at least one audience terminal via the broadcast-multicast port;
    receiving at the control unit a compressed audio stream comprising a request from the at least one audience terminal;
    decoding the compressed audio stream comprising the request; and
    analyzing the request.

2. The method of claim 1, wherein the conference is an audio conference, an audio/video conference, or a multimedia conference.

3. The method of claim 1, wherein designating the terminals is performed when reserving the conference, starting the conference, or connecting one of said terminals.

4. The method of claim 1, wherein the request comprises a request to change the requesting terminal from an audience terminal to a panel terminal.

5. The method of claim 4, wherein changing the requesting terminal comprises allocating an audio port to the requesting terminal.

6. The method of claim 1, further comprising determining at the control unit whether the request from the audience terminal can be implemented.

7. The method of claim 6, wherein determining whether the request from the audience terminal can be implemented comprises determining whether an audio port on the control unit is available.

8. The method of claim 6, wherein determining whether the request from the audience terminal can be implemented comprises determining whether an audio port on the control unit can be released.

9. The method of claim 1, wherein the request comprises a request to speak during the conference.

10. The method of claim 1, wherein the request comprises a vote.

11. The method of claim 1, wherein the request is received as an audio in-band signal.

12. The method of claim 1, wherein the request is received as a DTMF signal.

13. The method of claim 1, wherein the request is received as a signal of a voice.

14. The method of claim 1, wherein the request is received as a signal over one or more out-of-band channels.

15. A method of conducting a conference between a plurality of terminals with a conferencing control unit, the method comprising:
    initially designating at the control unit at least one terminal as a panel terminal;
    allocating an audio port for each of the at least one panel terminal, wherein the control unit generates a mixed audio signal from audio signals received from the at least one panel terminal, and transmits a mixed compressed audio signal to each of the at least one panel terminal via the associated audio port;
    initially designating at the control unit at least one terminal as an audience terminal;
    associating a broadcast-multicast port with the at least one audience terminal based on a total number of the plurality of terminals;
    wherein the audience terminal receives the mixed compressed audio signal from the broadcast-multicast port in the control unit;
    receiving at the control unit a compressed audio stream comprising a request from at least one audience terminal;
    decoding the compressed audio stream comprising the request; and
    analyzing the request.

16. The method of claim 15, wherein the conference is an audio conference, an audio/video conference, or a multimedia conference.

17. The method of claim 15, wherein designating the terminals is performed when reserving the conference, starting the conference, or connecting one of said terminals.

18. The method of claim 15, wherein the request comprises a request to change the requesting terminal from an audience terminal to a panel terminal.

19. The method of claim 18, wherein changing the requesting terminal comprises allocating an audio port to the requesting terminal.

20. The method of claim 15, further comprising determining if the request can be implemented by the control unit, thereafter receiving information from the requesting audience terminal.

21. The method of claim 20, wherein the request comprises a request to speak during the conference, and wherein the information comprises audio data from the requesting terminal.

22. The method of claim 20, wherein the information comprises a vote.

23. The method of claim 15, wherein the request is received as an audio in-band signal.

24. The method of claim 15, wherein the request is received as a DTMF signal.

25. The method of claim 15, wherein the request is received as a signal of a voice.

26. The method of claim 15, wherein the request is received as a signal over one or more out-of-band channels.

27. A system for conducting a conference over a network and between a plurality of terminals, the system comprising:
a control unit in communication with the plurality of terminals via the network, each of the plurality of terminal being designatable by the control unit as a panel terminal or an audience terminal,
wherein the control unit
allocates an audio port for each panel terminal,
receives audio signals only from the panel terminals via the audio ports,
generates mixed audio signals from the received audio signals,
associates a broadcast-multicast port with the audience terminals based on a total number of the plurality of terminals;
sends mixed compressed audio signals to the panel terminals via the audio ports and to the audience terminals via the broadcast-multicast port,
receives a compressed audio stream comprising a request from the at least one audience terminal,
decodes the compressed audio stream comprising the request, and
analyzes the request.

28. The system of claim 27, wherein the conference is an audio conference, an audio/video conference, or a multimedia conference.

29. The system of claim 27, wherein the compressed audio signal comprises a request from the audience terminal.

30. The system of claim 29, wherein the control unit changes the designation of an audience terminal to a panel terminal in response to the request.

31. The system of claim 29, wherein the control unit allocates an audio port to the requesting terminal.

32. The system of claim 29, wherein the control unit determines whether an audio port of the control unit is available for the requesting terminal.

33. The system of claim 29, wherein the control unit releases an audio port of an inactive panel terminal and allocates the released audio port to the requesting terminal.

34. The system of claim 27, wherein the electronic signals comprise a vote, a response, or a message for the conference.

35. The system of claim 27, wherein the compressed audio signals comprise a command from the audience terminal.

36. The system of claim 27, wherein the compressed audio signals comprise in-band signals, out-of-band signals, DTMF symbols, or voice signals.

37. A control unit for conducting a conference between a plurality of terminals, the control unit comprising:
at least one panel module comprising at least one audio port, the panel module allocated for one or more panel terminals of the plurality of terminals, the panel module receiving compressed audio signals only from the one or more panel terminals, generating mixed audio signals from the received compressed audio signals, generating mixed compressed audio signals from the mixed audio signals, and sending mixed compressed audio signals to the one or more panel terminals; and
at least one audience module, the audience module allocated for one or more audience terminals of the plurality of terminals, the audience module receiving compressed audio signals from the one or more audience terminals,
wherein the control unit includes one or more broadcast-multicast ports for the one or more audience terminals, and
wherein the control unit associates the one or more broadcast-multicast ports with the one or more audience terminals based on a total number of the plurality of terminals.

38. The control unit of claim 37, wherein the audience module includes a decoder/parser for decoding/parsing the audience data, and an analyzer for analyzing the decoded/parsed data.

39. The control unit of claim 37, wherein the modules are permanent or temporary logic modules.

40. The control unit of claim 37, wherein the compressed audio signal includes a request for the control unit to designate the sending audience terminal as a panel terminal.

41. The control unit of claim 40, wherein the control unit determines whether the panel module has a free audio port for the requesting terminal.

42. The control unit of claim 40, wherein the control unit allocates the free audio port of the panel module to the requesting terminal.

43. The control unit of claim 40, wherein the control unit releases an audio port of an inactive panel terminal and allocates the released audio port to the requesting terminal.

44. The control unit of claim 43, wherein the control unit designates the inactive terminal as an audience terminal.

45. The control unit of claim 37, wherein the compressed audio signal includes a vote, a response, or a message for the conference.

46. The control unit of claim 37, wherein the compressed audio signal is sent by the audience terminal to the control unit using in-band signals, out-of-band signals, DTMF signals, or voice signals.

47. The control unit of claim 37, wherein the compressed audio signal is sent over one or more out-of-band channels.

* * * * *